United States Patent [19]

Prasad

[11] Patent Number: 5,084,073
[45] Date of Patent: Jan. 28, 1992

[54] MEMBRANE DRYING PROCESS AND SYSTEM

[75] Inventor: Ravi Prasad, East Amherst, N.Y.

[73] Assignee: Union Carbide Industrial Gases Technology Corporation, Danbury, Conn.

[21] Appl. No.: 596,098

[22] Filed: Oct. 11, 1990

[51] Int. Cl.⁵ .................. B01D 53/04; B01D 69/08
[52] U.S. Cl. .................................. 55/16; 55/68; 55/158
[58] Field of Search .................. 55/16, 68, 158

[56] References Cited

U.S. PATENT DOCUMENTS

| | | | |
|---|---|---|---|
| 3,339,341 | 9/1967 | Maxwell et al. | 55/16 |
| 3,624,983 | 12/1971 | Ward, III | 55/16 |
| 3,735,558 | 5/1973 | Skarstrom et al. | 55/16 |
| 3,735,559 | 5/1973 | Salemme | 55/16 |
| 4,497,640 | 2/1985 | Fournié et al. | 55/16 |
| 4,631,128 | 12/1986 | Coplan et al. | 210/321.5 |
| 4,718,921 | 1/1988 | Makino et al. | 55/16 |
| 4,844,719 | 7/1989 | Toyomoto et al. | 55/16 |
| 4,875,908 | 10/1989 | Kikukawa et al. | 55/16 |
| 4,881,955 | 11/1989 | Bikson et al. | 55/16 |
| 4,894,068 | 1/1990 | Rice | 55/16 |
| 4,931,070 | 6/1990 | Prasad | 55/16 |
| 4,934,148 | 6/1990 | Prasad et al. | 55/16 X |
| 4,961,759 | 10/1990 | Taylor | 55/16 |
| 4,973,434 | 11/1990 | Sirkar et al. | 55/16 X |
| 4,981,498 | 1/1991 | Bikson et al. | 55/16 |

FOREIGN PATENT DOCUMENTS

| | | | |
|---|---|---|---|
| 0226431 | 6/1987 | European Pat. Off. | |
| 54-013653 | 2/1979 | Japan | 55/158 |
| 54-015349 | 2/1979 | Japan | 55/158 |
| 61-187918 | 8/1986 | Japan | 55/16 |
| 62-192589 | 8/1987 | Japan | 55/16 |
| 62-241527 | 10/1987 | Japan | 55/16 |
| 1-143624 | 6/1989 | Japan | 55/16 |
| 1-224029 | 9/1989 | Japan | 55/16 |
| 1-249123 | 10/1989 | Japan | 55/16 |

OTHER PUBLICATIONS

"Gas Separation by Permeation", Part I. Calculation Methods and Parametric Analysis, C.-Y. Pan and H. W. Habgood, The Canadian Journal of Chemical Engineering, vol. 56, Apr. 1978 pp. 197–209.

"Gas Separation by Permeators with High-Flux Asymmetric Membranes", C. Y. Pan, AIChE Journal, vol. 29, No. 4, Jul. 1983 pp. 545–552.

"Asymmetric Cellulose Acetate Hollow Fibers: Studies in Gas Permeation", M. Sidhoum, A. Sengupta, K. K. Sirkar, AIChE Journal, Mar. 1988, vol. 34, No. 3, pp. 417–425.

Primary Examiner—Robert Spitzer
Attorney, Agent, or Firm—Alvin H. Fritschler

[57] ABSTRACT

Enhanced air drying or other gas purifications are achieved using purge gas, rather than product gas, to facilitate permeation in membrane systems having substrates adapted to achieve radial mixing and having countercurrent flow patterns and uniform flow of gas over the surface of the membranes.

27 Claims, 2 Drawing Sheets

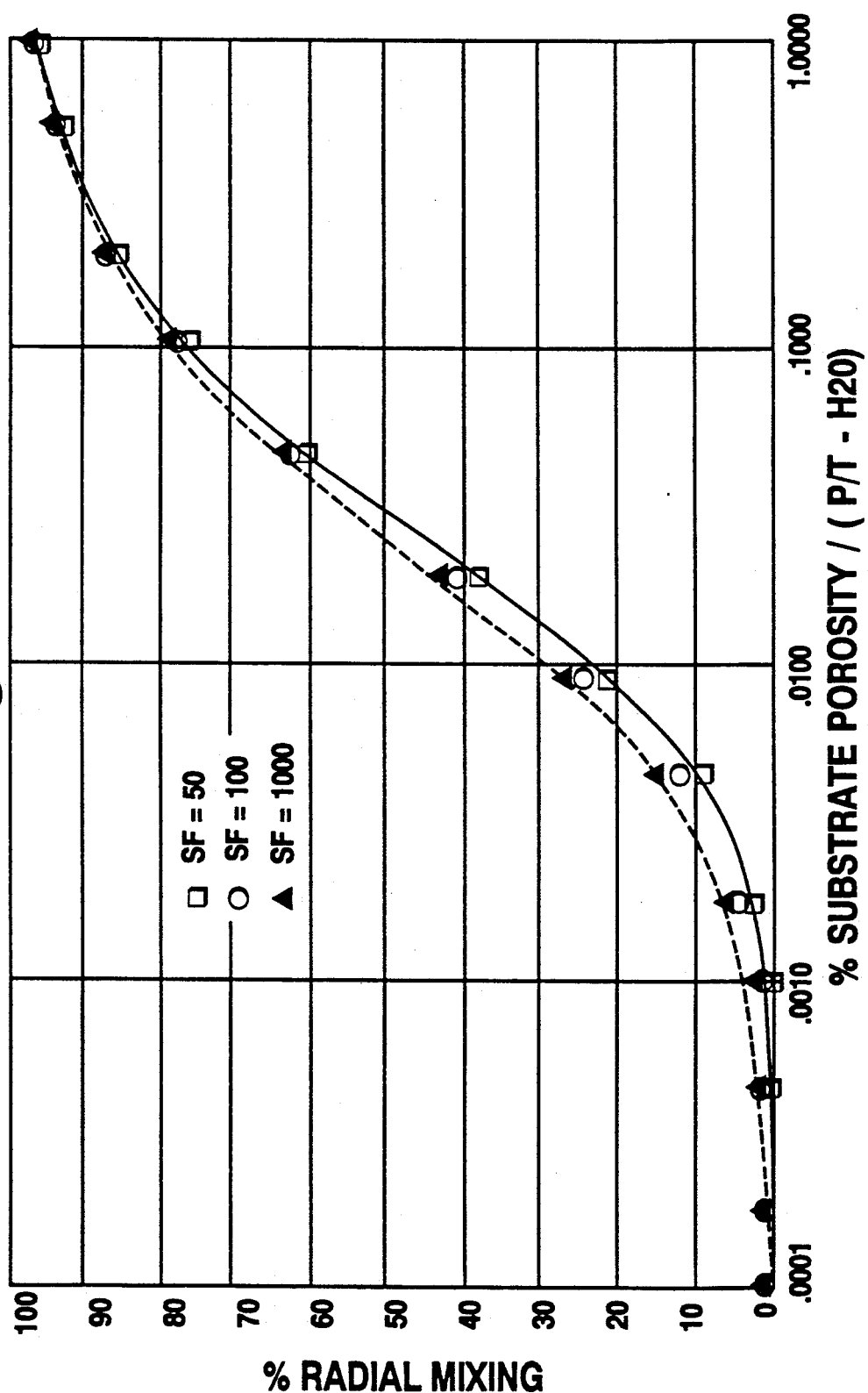

MEMBRANE DRYING PROCESS AND SYSTEM

BACKGROUND OF THE INVENTION

1. Field of the Invention

The invention relates to the drying of gases. More particularly, it relates to a membrane process and system for the enhanced drying of air and other gases.

2. Description of the Prior Art

Permeable membranes capable of selectively permeating a component of a gas mixture are considered as a convenient and potentially highly advantageous means for accomplishing desirable gas separations. To realize this potential in practical commercial operations, membrane systems must be capable of achieving a desired degree of processing efficiency. As water vapor and other condensable gases, such as carbon dioxide, are known to be highly permeable in many membrane materials, the drying of air or other gases is a significant membrane application, and one in which enhanced drying effectiveness is needed to satisfy the ever-increasing requirements of the art.

It is common practice to use membrane materials in the form of a multiplicity of small hollow fibers, arranged so that pressurized feed gas is exposed to a large membrane surface area, with the component thereof that is selectively permeated through the hollow fibers being removed as lower pressure permeable gas. The non-permeable gas is received at essentially the permeation pressure level. In such operations, the feed gas is commonly passed over the outside, or shell side, of the hollow fibers, while the permeate gas is removed from the fiber bores, this approach being referred to as an "outside-in" flow pattern. It is also possible to provide for the passage of the pressurized feed gas to the bores of the fibers, with the permeate gas being removed from the shell side space outside the fibers, i.e. in an "inside-out" flow pattern. Both of these patterns have been employed in the art in commercial membrane permeation processes.

If the high pressure feed gas and the lower pressure permeate gas separated by the membrane were in a stagnant or non-flowing condition, the partial pressure of the more permeable component, e.g. water or an impurity in the feed gas being treated, would approach a common equilibrium value on both sides of the membrane, and no further permeation of the more permeable component would occur. In practical operations, therefore, it is necessary that the feed gas be passed along the hollow fiber membrane, on either the bore side or the shell side, so that the partial pressure of the more permeable component can continue to decrease and separation thereof from the feed gas can continue to occur. This requires also that the lower pressure permeate stream have a progressively lower partial pressure for the more readily permeable component. It is well known in the art that such conditions can be advantageously achieved by disposing the permeable membranes in modules or columns arranged so that the higher pressure feed stream and the lower pressure permeate stream are caused to flow in opposite directions. Such operations are referred to generally as countercurrent flow operations.

In drying operations in which water or any impurity of a highly permeable nature is to be separated from air or other feed gas stream, it is also common practice to pass a dry or impurity-free gas on the lower pressure permeate side of the membrane as a purge gas to facilitate the maintaining of a partial pressure differential, and resulting permeation driving force, across the membrane.

Membrane modules employing countercurrent flow conditions and a purge gas stream have been used for drying small quantities of air for use in laboratory or analytical instruments. Such membrane module dryers are columns designed with four gas ports, i.e. (1) an inlet feed gas port, (2) an outlet non-permeate product gas port, (3) an input port for purge gas, and (4) an output port for the purge gas and the permeate gas. Such dryers employ homogeneous polymeric hollow fibers, with the fibers having a sufficient thickness to support the desired pressure difference across the membrane. The permeation rate for such membranes expressed by the permeability/thickness (P/t) ratio, is rather small, even with respect to high permeability gases, because of the required thickness of such homogeneous material membranes. As a result, such homogeneous hollow fiber membranes are not well suited for large-scale commercial gas drying applications.

Membrane technology is also known in the art, for gas drying and other fluid separations, wherein membrane configurations other than those based on a homogeneous or uniform density of a single membrane material are employed. Thus, composite and asymmetric hollow fiber membranes are available for desirable fluid separations. Composite membranes comprise a thin separation layer or coating of a suitable permeable membrane material superimposed on a porous substrate. The thin separation layer determines the separation characteristics of the composite structure, with the porous substrate providing physical support for the separation layer. Asymmetric membranes, on the other hand, are composed of a single permeable membrane material having, in distinction from homogeneous membranes, a thin, dense semipermeable skin region that determines the separation characteristics of the membrane, and a less dense, porous, generally non-selective support region that serves, as does the porous substrate of composites, to preclude the collapse of the thin skin region under pressure. Both types of non-homogeneous hollow fiber membranes, i.e. composites and asymmetrics, exhibit relatively high permeability/thickness ratios compared to those of homogeneous membranes, particular with respect to the permeability of condensable gases.

For use in practical commercial operations, membrane structures of the types indicated above are commonly employed in membrane assemblies or bundles that are typically positioned within enclosures to form membrane modules, the principal element of an overall membrane system. Such a membrane system commonly comprises a membrane module, or a number of such modules, arranged for either parallel or series operation.

Using non-homogeneous hollow fibers for gas separation applications, the high pressure feed gas stream frequently is applied to the side of the membrane hollow fiber on which the separation portion of the membrane is positioned, whether this be on the inside or the outside of the hollow fiber. The gases that permeate the separation layer or skin thus pass into the porous substrate portion of the membrane and are removed from the non-separation side of the membrane structure.

Hollow fiber membrane modules have commonly been fabricated so that, in the local vicinity of each individual hollow fiber, the flow patterns approximate cross-flow, even though the global flow arrangement might appear to be countercurrent. In cross-flow operation, the flow direction of permeate gas on the permeate side of the membrane is at right angles to the flow of feed gas on the feed side of the membrane. For example, when the passage of feed gas is on the outside of the hollow fiber membranes, the flow direction of permeate gas in the bores of the fibers is generally at right angles to the flow of feed gas over the external surface of the hollow fibers. Likewise, in the inside-out approach in which the feed gas is passed through the bores of the hollow fibers, the permeate gas generally passes from the surface of the hollow fibers in a direction generally at right angles to the direction of the flow of feed gas within the bores of the hollow fibers and then, within the outer shell, in the direction of the outlet means for the permeate gas. Such cross-flow type of flow pattern is to be distinguished from a countercurrent flow type of flow pattern. In such countercurrent flow pattern, the feed gas or the permeate gas, depending on whether inside-out or outside-in operation is desired, is caused to pass in countercurrent flow along the outside surface of the hollow fibers parallel to the flow direction of permeate gas or feed gas in the bores of the hollow fibers. The feed gas on the outside of the hollow fiber bundle, for example, is caused to flow parallel to rather than at right angle to the central axis of the hollow fiber.

In membrane drying operations of the type described above, there is a tendency to encounter a concentration polarization across the substrate portion of the membrane and to operate under cross-flow permeation characteristics when using composite or asymmetric membranes as opposed to a dense, homogeneous membrane fiber. Where such a concentration polarization occurs to a significant extent across the substrate portion of the membrane, i.e., a concentration gradient exists across said substrate portion, the driving force across the thin separation layer of the composite membrane or across the thin skin portion of an asymmetric membrane is thereby decreased. In the absence of such concentration polarization, the pressure differential between the feed gas and the permeate gas streams on opposite sides of the membrane can be effectively utilized to facilitate the desired selective permeation of water from feed air or other desired drying operation. In this regard, it is important to appreciate that even if the concentration of permeating component were the same on both sides of the substrate, i.e. 0% concentration polarization, which condition is also sometimes referred to as "perfect radial mixing," but the flow patterns across the membrane bundle are of the cross-flow type, the overall permeation result would be consistent with the conventional mathematical model for cross-flow permeation. Similarly, if the flow patterns of the membrane bundles were arranged for countercurrent operation, but the fiber design morphology were such that a concentration polarization fully formed across the substrate, i.e. 100% concentration polarization, the overall performance of the membrane would again be consistent with the model for cross-flow permeation and not for countercurrent permeation. Those skilled in the art will appreciate that countercurrent permeation operations, in which a significant degree of radial mixing is achieved, are generally desired and provide higher permeation levels than cross-flow permeation operations as confirmed by the mathematical models for the two types of operation.

When membrane drying operations are carried out using a homogeneous dense fiber membrane as indicated above, a significant level of the desired countercurrency is achieved, and such dense fiber membranes can generally be employed either with the use of a purge gas on the permeate side, as indicated above, or without such purge gas. In the latter case, good drying requires operation at a relatively high stage cut, i.e. a considerable amount of the gas being dried must copermeate with the water in order to flush said water from the membrane system in the waste stream. Such operation is not suitable when high product recovery is required.

It will be appreciated that the membrane thickness of a dense fiber is also its wall thickness, which is very large in comparison to the skin portion of an asymmetric membrane or to the separation layer of a composite membrane. For a dense fiber, it is necessary to have a large wall thickness to achieve a significant pressure capability. Thus, dense fibers have a very low permeation rate and require the use of a very large surface area to achieve adequate drying in commercial operations. This tends to be a critical disadvantage in commercial applications due to the large costs associated with the providing of such membrane area. As noted above by contrast, asymmetric or composite membranes have very thin membrane separation layers, with the more porous support portion thereof providing mechanical strength and support for the very thin portion that determines the separation characteristics of the membrane. Much less surface area is required, therefore, for asymmetric or composite membranes than for dense, homogeneous membranes.

While dense membranes do not tend to experience concentration polarization across the surface thereof, thus enabling such membranes to exhibit countercurrent permeation, both asymmetric and composite membranes are subject to concentration polarization and have tended to exhibit cross-flow permeation flux (i.e. permeation/time) characteristics in practical applications thereof. Because of the inherently improved permeability obtainable by the use of asymmetric or composite membranes rather than dense membranes, it would be desirable in the art to further improve asymmetric and composite membrane performance to facilitate the achieving of the benefits of membrane drying and other separation operations in practical commercial operations.

Mathematical modeling for the analysis of membrane performance is illustrated in "Gas Separation by Permeation, Part I. Calculation Methods and Parametric Analysis" by C. Y. Pan and H. W. Habgood, The Canadian Journal of Chemical Engineering, Vol. 56, April, 1978, pp. 197-209. Utilizing such mathematical modeling analysis techniques, C. Y. Pan concluded, based on an analysis of asymmetric membranes, that said membranes always give rise to cross-flow type of permeation operation, regardless of the flow pattern and the direction of flow of the feed and permeate streams. Such conclusions, and the mathematical basis therefor, are disclosed in "Gas Separation by Permeators with High Flux Asymmetric Membranes" by C. Y. Pan in the AIChE Journal, Vol. 29, No. 4, July, 1983, pp. 545-552.

On the basis of such analysis, it was commonly concluded that air and other gas separation operations were necessarily operable in a cross-flow manner and that, to enhance such operations, the membrane bundle design should be a design serving to enhance such cross-flow permeation operation. Accordingly, many membrane bundles are provided with a multiplicity of holes along the longitudinal length of the bundles to facilitate the carrying out of cross-flow permeation patterns. As mentioned above, even if the morphology of the substrate were such as to preclude concentration polarization under such circumstances, the overall membrane performance achieved using such bundle design would be that consistent with the mathematical modeling for cross-flow permeation.

It has more recently been observed in the art that, contrary to such earlier prior art expectations, many membranes exhibit a significant degree of countercurrency in operation, with less concentration polarization than would have previously been predicted. Thus, M. Sidhoum, W. Sengapta and K. K. Sirkar, in "Asymmetric Cellulose Acetate Hollow Fibers: Studies in Gas Permeation", AIChE Journal, Vol. 34, No. 3, March 1988, pp. 417-425, refer to such earlier mathematical modeling and the indicated creation of a cross-flow permeation pattern for asymmetric membranes (as contrasted to the pattern for the less desirable symmetric or homogeneous membranes). The authors reported that the behavioral pattern of such membranes supposedly characterized by cross-flow permeation patterns did not fully follow the modeling for cross-flow operation, but better followed the homogeneous membrane model that is consistent with countercurrent flow behavior. Contrary to prior expectations, therefore, many asymmetric and composite membranes do, in fact, possess a significant degree of countercurrency. It is highly desirable in the art, in light of this evolving understanding, to develop improved membrane drying and other gas separation processes and systems to enhance countercurrent permeation.

It is an object of the invention, therefore, to provide an improved process and system for membrane drying and other separation applications.

It is another object of the invention to provide a composite or asymmetric hollow fiber membrane separation process and system possessing an enhanced degree of drying capability.

It is a further object of the invention, to provide a membrane process and system for minimizing the membrane surface area and product permeation loss necessary to achieve a desired level of drying or like separation.

With these and other objects in mind, the invention is hereinafter described in detail, the novel features thereof being particularly pointed out in the appended claims.

SUMMARY OF THE INVENTION

Air drying and other gas separations are carried out employing an overall combination of processing and system features, for asymmetric or composite hollow fiber membranes, such that enhanced drying or other purification is achieved. Such features include a specified membrane substrate morphology for significant radial mixing, a countercurrent flow pattern along the permeate and non-permeate surfaces of the membrane, the use of purge gas and an arrangement of hollow fibers so as to provide a uniform flow of feed gas across the membrane surface.

BRIEF DESCRIPTION OF THE DRAWINGS

The invention is further described in detail with reference to the accompanying drawings in which:

FIG. 2 is a diagram illustrating the relationship of the degree of countercurrent flow pattern across the membrane to the separation factor, substrate morphology, and permeation rate.

DETAILED DESCRIPTION OF THE INVENTION

Figure 1:
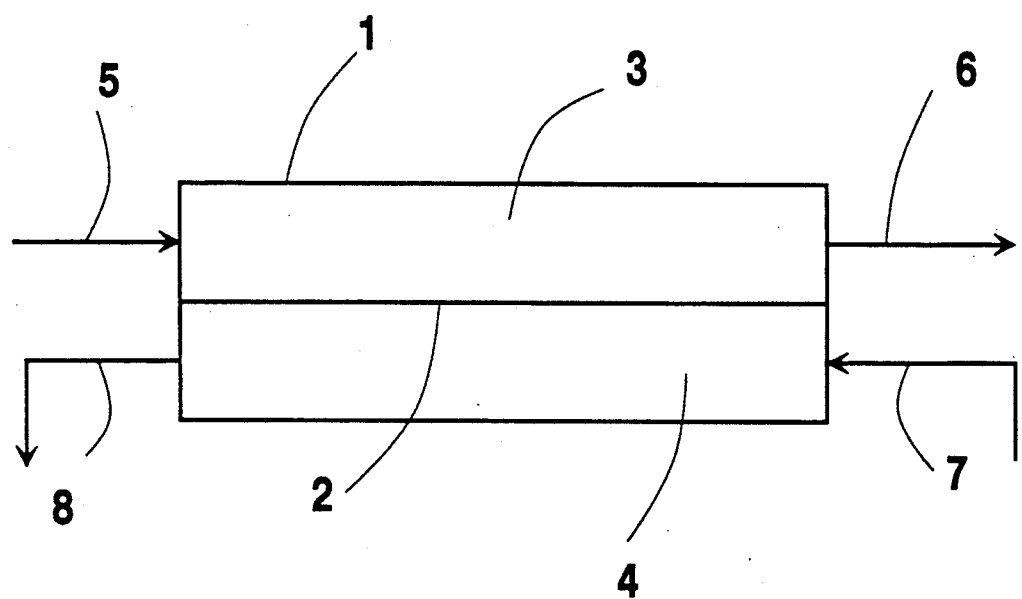
FIG. 1 is a schematic flow diagram of a membrane system employed in the practice of the invention, including provision for purge gas on the permeate side thereof.

The objects of the invention are accomplished by employing hollow fiber membrane systems, comprising either asymmetric or composite membranes, having a substrate morphology establishing a significant degree of radial mixing across the substrate, together with the use of purge gas, and countercurrent process stream flow patterns, and a uniform flow pattern across the membrane. Operation of the hollow fiber membrane systems in this manner enables enhanced drying or other purification to be achieved at desirably high product, i.e. non-permeate gas, recovery levels. Such membrane performance will follow, at least partially, the countercurrent mathematical model of membrane performance rather than the cross-flow model. Since the cross-flow mathematical model of membrane performance was previously believed to pertain with respect to gas separations, many earlier module designs were developed to yield cross-flow arrangements. Other designs that were developed to produce global flow arrangements that were countercurrent, nevertheless yielded cross-flow patterns in the local vicinity of each hollow fiber. Contrary to such prior practice, the overall countercurrent permeation performance of the invention results in the appreciable reduction obtained in the amount of valuable product gas, e.g. nitrogen/oxygen, lost by co-permeation in cross-flow operation of the membranes.

It will be appreciated that the countercurrent and cross-flow mathematical models of membrane performance can be calculated for any membrane material and configuration by those skilled in the art, on the basis of established modeling criteria, as indicated by the cited prior art. Membrane performance for any membrane system can be determined by routine testing and compared with such mathematical models. In the practice of the invention in accordance with the countercurrent model, the dry reflux purge gas employed on the low pressure, permeate side of the membrane substitutes for the co-permeation of desired product gas from the feed stream (in cross-flow operation) in carrying away of water vapor, or other permeate gas, from the membrane separation layer, thus keeping the driving force for moisture or impurity removal quite high. This not only minimizes product permeation loss necessary to achieving a desired drying or purification level, but minimizes the membrane area required to achieve such separation. While the use of purge gas for drying purposes and the like has recently been appreciated with respect to practical commercial operations, the state-of-the-art with respect to cross-flow vis-a-vis countercurrent flow patterns across the membrane, as discussed above, has heretofore contributed to the lack of an appreciation of the potential benefits of a significant degree of countercurrency of membrane performance, or of means for enhancing such countercurrency in practical commercial operations.

In the practice of the invention, therefore, the membrane employed for air drying or other gas purification purposes will enable enhanced gas separation at high product (non-permeate) recovery levels and will exhibit a significant degree of countercurrency of performance. This parameter or measure of performance is defined herein, consistent with the known state-of-the-art, as the degree to which membrane performance approaches the countercurrent mathematical model for the membrane. At 100% countercurrency, the membrane performance would be identical to that predicted by the countercurrent model. At 0% countercurrency, said performance is identical to the cross-flow model. The degree of countercurrency achievable in the practice of the invention will generally be at least about 20%, typically about 50% or more, and desirably about 80% or above, and such relatively high degree of countercurrency of performance represents a very desirable advance in the membrane drying art. In this regard, it will be understood that said degrees of countercurrency observed in any particular application are subject to variation depending upon the overall conditions pertaining to that application, including the particulars of the mathematical models employed for analysis of membrane performance. For this reason, the degree of countercurrency is a reflection of the benefits of the invention, rather than a limitation to be employed to achieve such benefits in the practice of the invention.

As indicated above, enhanced drying or other such gas purification performance is achieved by employing (1) a membrane substrate morphology such that a significant degree of radial mixing is achieved across the substrate portion of the membrane, together with (2) a countercurrent flow pattern across the permeate and non-permeate surfaces of the membrane compromising skin and substrate portions, i.e. outside the fiber and inside the bore thereof, (3) the use of purge gas on the permeate side of the membrane, and (4) an arrangement of the hollow fiber membranes so that a uniform flow of gas is achieved across both the feed (non-permeate) and permeate sides of the membrane comprising said skin (or separation layer in composites) portion and said substrate portion. This novel combination of features enables enhanced membrane performance to be achieved, with the indicated high recovery of desired product gas as the non-permeate gas.

The gas purification operations with respect to which the invention is particularly suitable, e.g. the drying of air or the separation of impurities from feed streams, are those in which the water vapor or impurity being separated has a high selectivity of separation compared to that of the feed stream being dried or purified. Thus, the separating component will have a separation factor, or selectivity, of at least about 15 with respect to the feed stream to be dried or purified. The invention is particularly suitable for separations in which the separating component has a separation factor of about 50 or above, more particularly about 100 or above, and especially where the separation factor is at least 1,000 or higher. The drying of air is an example of such latter circumstance. Other practical commercial operations in which the practice of the invention is highly desirable include, but are not limited to, the separation of $CO_2$ or methane from nitrogen; of acid gases from inert streams, such as nitrogen; and of ammonia from nitrogen. In all such embodiments of the invention, the enhanced gas separation, with desirably high product recovery levels, is indicative of a significant countercurrency of membrane performance.

With reference to FIG. 1 of the drawing, a membrane permeator module for gas drying, represented generally by the numeral 1, comprises a helically-wound bundle 2 of composite hollow fibers of essentially uniform length. The separating layer of said composites is deposited on the external or the internal surface of the porous hollow fibers. The high-pressure, non-permeate side 3 of the membrane will be understood to be either the bore side or the outer shell side of the hollow fibers, with side 4 representing the other, low pressure, permeate side of the hollow fibers. In the illustrative examples referred to below, the separating layer was deposited on the external surface of the hollow fibers, and the high pressure feed gas was applied to the shell side of the membrane, i.e., to the side on which the separating layer was deposited. Permeate gas separated from the feed gas thus passed in an outside-inside direction, with permeate gas being withdrawn from the bores of the hollow fibers. A wet feed gas stream 5 to be dried was introduced to high pressure side 3 of the membrane at the feed end thereof, and the dried product gas 6 was withdrawn from the opposite, or product, end thereof. A dry purge gas stream 7 was admitted to low pressure side 4 of the membrane at the product end thereof, and a moisture laden waste stream 8 was withdrawn at low pressure from the opposite, or feed, end of the membrane. Using such a membrane system, or variations thereof as indicated herein, enhanced gas drying or purification can be achieved in the practice of the invention when the water or other separating component has a separation factor as indicated above with respect to the feed stream being dried or purified.

As indicated above, perfect radial mixing would occur if the concentration of the permeating component were the same on both sides of the substrate, that is, under 0% concentration polarization. The degree of radial mixing actually achieved may be defined by the formula:

$$RM = \frac{y \max - y}{y \max - y \text{ bore}},$$

where y max is the concentration at the low pressure, permeate side of the substrate portion of the membrane as computed by the cross-flow model of membrane performance; y is the actual concentration at the low-pressure side of the substrate, and y bore is the concentration in the fiber bore. When there is no radial mixing, y will equal y max, and a concentration polarization exists across the surface of the substrate. If perfect radial mixing were to occur, and there was no concentration polarization across the substrate, y would equal y bore.

The relationship of said radial mixing to the substrate porosity, the separation factor (selectivity) of representative composite hollow fiber membranes and the permeability flux for air drying applications has been developed and is plotted in FIG. 2 of the drawing for air drying applications. The term "permeability flux" as used herein denotes the permeability-to-thickness ratio of water for air drying applications, or of an impurity in gas purification operations, expressed in engineering units of $ft^3/day/psi/ft^2$. The abscissa of said FIG. 2 plot is the porosity of the membrane substrate divided by said permeability flux on a logarithmic scale. The plotted curves illustrate the effect of different separation factors, i.e., the selectivities of different separation layer materials for said air drying application. The effect of appreciable differences in separation factor will be seen to be modest, with the curves for separation factors from 50 to 1,000 actually lying closely together. For a significant degree of radial mixing, i.e., above about 10%, the substrate porosity divided by P/T must be larger than about 0.005. For a high degree of radial mixing, i.e., about 80% or more extending to nearly complete radial mixing, the substrate porosity divided by said permeability flux must be larger than about 0.1 as shown in FIG. 2. The permeability flux values for water, in said engineering units, will generally range from about 5 to about 50. Accordingly, the substrate porosity should be from about 0.5% to about 5% or greater in order to achieve a high degree of radial mixing, and about 0.05% or greater to achieve a significant level of radial mixing as indicated above. Such substrate porosity ranges will be understood to pertain not only with respect to air drying applications, but also with respect to other gas purification applications as well. While such values were determined on the basis of the use of substrates having a uniform porosity, such values are also generally applicable for the average porosity of substrates such as the lower density support region of asymmetric membranes, or composite membrane substrates exhibiting a degree of asymmetry, which have a graded substrate porosity.

The curves shown in FIG. 2 were determined on the basis of the substrate being positioned on the low pressure, i.e., permeate, side of the hollow fiber membrane system. The achieving of a high degree of radial mixing would, in fact, be facilitated if the substrate were on the high pressure, i.e., non-permeate, side of the hollow fiber membrane system. In such embodiments, the curves shown in FIG. 2 would be shifted to the left in proportion to the high pressure/low pressure ratio across the hollow fiber membrane. Thus, it is generally advantageous, if circumstances permit, to position the substrate on the high pressure side, i.e. the feed side, of the membrane. Furthermore, to reduce the pressure drops for the high pressure and low pressure streams, it is generally advantageous to pass the high-pressure feed gas stream through the bores of the hollow fiber membranes, while flowing the purge-permeate stream on the shell side of the membrane, with the thin, dense separation region of an asymmetric membrane and the thin separation layer coating of a composite membrane positioned on said shell side of the membrane.

While a membrane substrate morphology such as to achieve a significant degree of radial mixing across the substrate is important to the achieving of enhanced drying or other gas purification performance, such achievement, by itself, does not provide for such enhanced performance. Among the other necessary factors identified above is the providing of countercurrent flow patterns across the permeate and non-permeate surfaces of the membrane. Such countercurrent flow patterns can be created by encasing a hollow fiber bundle within an impervious barrier over the longitudinal outer surface thereof except for a non-encased flow passage region. European Patent Publication No. 0226431, published June 24, 1987, discloses such countercurrent flow pattern creation, which enables the feed gas or permeate gas, depending on the desired manner of operation, i.e., inside-out or outside-in flow, to pass in countercurrent flow outside the hollow fibers parallel to the flow direction of permeate gas or feed gas in the bores of the hollow fibers. For example, feed gas on the outside of the hollow fiber bundle is caused to flow parallel to, rather than at right angle to, the central axis of the fiber bundle. The impermeable barrier material may be a wrap of impervious film, e.g., polyvinylidene or the like. Alternatively, the impermeable barrier may be an impervious coating material, e.g., polysiloxane, applied from an innocuous solvent, or a shrink sleeve installed over the membrane bundle and shrunk onto the bundle. An O-ring or other barrier such as structured packing may also be positioned between the hollow fiber bundle and the shell of the membrane module, or the shell itself may be positioned in close proximity to the membrane bundle so as to form the desired barrier. The impermeable barrier, in such embodiments, thus encases the hollow fiber bundle, other than for an opening therein permitting the flow of gas into or away from the bundle, so that the fluid flows along the outer surface of essentially all of the hollow fibers in the bundle in a direction substantially parallel to the axis of the hollow fiber bundle. The resulting flow pattern is one of countercurrent flow of the wet feed (air) stream and the permeate gas, which comprises purge gas together with moisture or gas impurity that permeates through the membrane material.

The third requirement for the enhanced air drying or gas purification operation of the invention is the use of essentially dry purge gas on the permeate side of the membrane. If the cross-flow type of permeation were carried out, the use of purge gas should have no effect on the amount of drying achieved. In operations exhibiting a significant degree of countercurrency, on the other hand, the purge gas serves to facilitate the removal of permeate gas, e.g., moisture in the air drying application, from the surface of the membrane. The purge gas enables a high driving force to be maintained across the membrane to sustain the desired moisture or impurity removal from the feed stream. This feature of the overall invention serves to minimize the membrane surface area required and the desired product, e.g. dry air, permeation loss otherwise required to achieve a desired level of drying or purification. It will be readily appreciated that it is desirable to minimize nitrogen-/oxygen product loss due to co-permeation of said nitrogen/oxygen from feed air, or other desired non-permeate product gas, to the fullest extent possible. For example, it is desirable to maintain such product loss due to co-permeation to less than 1%, preferably less than 0.5% of the total flow of non-permeate product gas from the membrane system. Further information relating to the purge requirements of the invention are provided in the example below.

The fourth feature required in the practice of the invention comprises an arrangement of the hollow fiber membranes so that a uniform flow of feed gas, and of permeate gas, can be achieved across the surface of the membranes. In a desirable embodiment of this feature of the invention, the hollow fiber membranes are arranged in a helically wound hollow fiber membrane cartridge containing hollow fibers of essentially uniform active lengths. Such helical winding is known in the art as evidenced by the disclosure of the Coplan et al patent, U.S. Pat. No. 4,631,128. Those skilled in the art will appreciate that the desired uniform flow distribution of gas across the surface of the hollow fibers cannot be achieved simply by arranging the hollow fibers in the membrane cartridge with a parallel or straight configuration rather than the particular helical winding configuration referred to above. Thus, the straight configuration of hollow fibers will, in practice, contain particular hollow fibers crimped to varying degrees such as to preclude the desired uniform flow distribution. It will be appreciated, however, that other, less economically desirable means may be employed to achieve said uniform flow of gas. Thus, it is possible to provide screens or other flow restriction means, such as baffles, which can be arranged to achieve said uniform flow path. The hollow fibers can also be arranged in a braided form similar to rope, with the structured pattern thereof enabling the desired uniform gas flow to be achieved.

It will be appreciated that various changes and modifications can be made in the details of the subject invention as herein described without departing from the scope of the invention as set forth in the appended claims. Thus, the membrane material may be any suitable material capable of selectively permeating water or an impurity desired to be removed from air or other gas stream at a suitable separation factor level. Composite hollow fiber membranes are conveniently prepared using polysulfone or other desired substrates and a separation layer of ethyl cellulose, cellulose acetate or other such membrane material. Asymmetric membranes comprised of materials such as cellulose acetate, polysulfone and the like may also be employed. It will be appreciated, however, that such materials are merely representative of the variety of suitable materials available in the art that can be used in the practice of the invention, either as the substrate or separation layer material of composite membranes or as the material used in asymmetric form. The hollow fibers of such materials can be spun in accordance with procedures well known in the art. For example, porous polysulfone hollow fibers can conveniently be spun from a ternary solution of polysulfone, in a known solvent/non-solvent mixture following the procedures described by Cabasso et al in "Composite Hollow Fiber Membranes", Journal of Applied Polymer Science, Vol. 23, pages 1509–1523. The well known, tube-in-tube jet technique can be used in said spinning procedure, with water at about 21° C. being the outside quench medium in the fibers. The quench medium in the center bore of the fiber is conveniently air. Quenching is followed by the washing of the fibers with water. Following wash, the hollow fibers are dried at 30° C. by passage through a hot air drying column. For the preparation of composite membranes, the dried hollow fiber can be immediately coated in-line with a suitable separation layer solution, e.g., with an ethyl cellulose polymer solution. Such a solution can be prepared by dissolving about one percent ethyl cellulose in isopropanol and then filtering through a 1.5 millimicron glass filter prior to application to the polysulfone hollow fiber supporting layer or substrate. The direct hollow fiber substrate can be passed through the filtered coating solution contained in a coating vessel, with the coated fiber then being dried in an air oven prior to being taken up on a winder. The thus-prepared, illustrative polysulfone hollow fiber composite membrane desirably has a very thin coating thickness, e.g., about 0.2 micron or less. Such composite hollow fiber membranes, using cellulose triacetate as a representative membrane material, will have a separation factor of about 5.9 between oxygen and nitrogen, and a permeability flux for oxygen of about 0.08 $ft^3/ft^2 \cdot psi \cdot day$. The hollow fibers are used to construct permeator cartridges upon the winding thereof, with one or more cartridges being positioned within membrane modules adapted for the passage of feed gas and purge gas thereto and for the separate removal of non-permeate gas and a combination of permeate gas and purge gas therefrom. Those skilled in the art will appreciate that the membrane module employed will be a suitable four-port module adapted for the introduction of feed gas and purge gas and for the separate removal of said permeate-purge gas and non-permeate gas streams. It will also be understood that the feed gas may either be passed to the bores of the hollow fibers, for inside-out flow, or to the shell side of the membrane for outside-in flow.

The invention will be understood to have a variety of practical commercial applications in addition to the important air drying application discussed herein. Thus, gas separations such as the fast permeation of carbon dioxide from nitrogen or methane, and the separation of ammonia from nitrogen constitute other illustrative examples of the practice of the invention.

The invention is hereinafter described with reference to particular examples of the practice thereof. Such examples will be understood to illustrate the invention and the advantages thereof, and should not be construed as limiting the scope of the invention as set forth in the appended claims.

EXAMPLE 1

In this example, a helically-wound cartridge having hollow fibers of equal length was employed the cartridge being potted and the fiber bundle cut so that both ends of the fibers were accessible to gas flow and the module could be operated as a four-port module as shown in FIG. 1. The hollow fiber membrane employed was a composite membrane formed using a polysulfone hollow fiber substrate having an ethyl cellulose separation layer coated hereon. The hollow fibers were helically wound so as to have equal active lengths. An impervious polyvinylidene film was positioned around the hollow fiber bundles to assure countercurrent flow of feed gas and non-permeate gas on the outer surface of the hollow fibers, i.e., parallel to the flow of permeate gas and purge gas inside the bores of the hollow fibers, the membrane thus being employed using an outside-in flow pattern. As used for permeation drying, the feed air and the non-permeate or retentate streams were at a pressure of about 150 psig, while the permeate gas was at near atmospheric pressure or 0 psig. At such conditions, there is an appreciable permeation of the components of air, i.e, oxygen and nitrogen, as well as water vapor present in the feed air. Thus, a high permeation of valuable product gas occurred in order to achieve the desired drying.

In order to reduce the permeation of the principal components of air, tests were carried out using purge air, with the purge air and permeate streams being at a pressure of about 149 psig, so that only a 1 psi differential pressure existed across the membrane. The non-permeate flow was varied from 21 to 85 NCFH, but even at the lower flow rates, the dry-air stage cut was only 2%. The purge air flow was also varied, and analyzers were used to measure the water vapor concentrations in the feed, non-permeate, purge and waste permeate streams. The measured moisture content in the feed stream varied only slightly and averaged 1073 ppm. The essentially dry purge stream water content varied from about 0.85 to about 1.50 ppm, with the average being about 1.29 ppm. The ratio of the permeability of water to that of oxygen, i.e., the separation factor, for water and oxygen, was greater than 100 for the membrane material used, with the separation factor for water and nitrogen being much larger. The effective P/t value for water was found to be between 4 and 8 in said engineering units referred to above. The polysulfone substrate porosity was in the range of from 0.5% to about 1%.

Many tests were run over a period of three months. Because the concentrations approach steady state slowly, the following data represents tests run for at least 20 hours, or even several hundred hours. The results are shown in Table I below.

TABLE I

| Feed Flow (NCFH) | Cleaning Ratio | Non-Permeate Water (ppm) | % Water Removal |
|---|---|---|---|
| 23 | 0.02 | 1075.0 | 13.31 |
| 24 | 1.02 | 53.80 | 95.37 |
|  | 1.73 | 1.48 | 99.86 |
| 21 | 1.27 | 4.97 | 99.57 |
|  | 1.66 | 2.05 | 99.81 |
| 44 | 1.10 | 32.85 | 96.91 |
|  | 1.23 | 14.98 | 98.61 |
|  | 1.70 | 1.38 | 99.86 |
| 65 | 1.15 | 38.40 | 96.24 |
|  | 1.25 | 14.10 | 98.62 |
|  | 1.71 | 1.38 | 99.87 |

As used above, the cleaning ratio is the purge ratio divided by the pressure ratio of the lower pressure on the permeate side of the membrane to the higher pressure on the non-permeate side thereof, i.e., CR=purge ratio÷(P low/P high). The purge ratio as used therein is the ratio of the STP volumetric purge flow to the STP volumetric product flow. STP, as used herein, refers to the standard condition of 0° C. and one atmosphere atmospheric pressure. The results demonstrate that, using purge gas and employing a cleaning ratio greater than one, nearly complete removal of the water content of the feed stream can be achieved under the overall conditions of the invention. Such conditions will be understood to include, as discussed above and as employed in the example, a membrane substrate morphology such as to achieve a significant degree of radial mixing across the substrate portion of the membrane, a countercurrent flow pattern across the membrane, and an arrangement of hollow fiber membranes such as to achieve a uniform flow of gas across the membrane. If less than nearly complete water (or impurity) removal were desired, it will be understood that a cleaning ratio of less than one can be employed, as in a partial drying application. Thus, cleaning ratios of about 0.9 can conveniently be employed, with even lower ratios of down to about 0.6 or 0.5 being suitable for certain applications.

In the first run, no purge gas was employed, and the operable mechanism was one of permeation-type cleaning rather than purge-type cleaning. As a result, the amount of water removed was small, with only about 13% of the water being removed by the effect of the permeation of oxygen and nitrogen in the feed air. In all of the other runs, based on purge-type cleaning, more than 95% of the water was removed, with the degree of drying or purification depending on the cleaning ratio employed. With a cleaning ratio of 1.7, more than 99% of the water is removed by the waste-purge stream, and the non-permeate stream is nearly as dry as the dry air used for the purge stream. It should be noted that these highly desirable results for purge type cleaning were obtained with only a negligible amount of product gas loss, which was less than 2% in all cases. The measured water content of the waste stream enabled a mass balance of the water to be made, which confirmed that essentially all of the water in the feed air was being removed in the waste stream. It should be noted that, in the event the membrane had been operated in a cross-flow manner, the purge gas would not have had an effect on the amount of drying, and such drying would be accomplished by, and at the expense of, the permeation of oxygen and nitrogen from the feed air being dried.

EXAMPLE 2

The membrane module used in this example was similar to that used in Example 1, except that the hollow fibers used were specially prepared using a very thick coating of the ethyl cellulose material. By greatly increasing the thickness of the membrane, the permeability flux of oxygen and nitrogen were greatly reduced. This thicker membrane allowed the use of a more typical pressure differential across the membrane, without the permeation of significant amounts of air. Water vapor, on the other hand, has such a large permeability that it exhibits a high rate of transport, even through the thicker membrane. Surprisingly, the effective P/t value of water was found to be 3-5 engineering units, which is not much lower than the values found in Example 1. This implies that other impediments to water transport, such as perhaps capillary condensation, were operative in Example 1. The substrate material was the same as that used in Example 1, the substrate porosity was the same, i.e., 0.5-1%, and the other features of the invention were the same as in the Example 1 embodiment.

The test runs of Example 2 were conducted in accordance with the flow diagram of FIG. 1, with the high-pressure feed and non-permeate streams being at 114.7 psia, and the low-pressure purge and permeate streams being at 14.7 psia, i.e., atmospheric pressure. The dry-air stage cut was determined to be about 2%. The feed air stream had a moisture content of about 3,000 ppm, and the essentially dry air used for purge purposes had a moisture content of 2.7 ppm. The results of such tests are shown in Table II below.

TABLE II

| Feed Flow (NCFH) | Cleaning Ratio | Non-Permeate Water (ppm) | % Water Removal |
|---|---|---|---|
| 21.2 | 0.18 | 2619.0 | 16.00 |
| 21.2 | 1.17 | 51.1 | 98.42 |
|  | 1.56 | 5.38 | 99.84 |
|  | 1.95 | 3.69 | 99.87 |
| 42.4 | 1.17 | 121.8 | 96.36 |
|  | 1.56 | 21.96 | 99.30 |
|  | 1.95 | 11.46 | 99.64 |
| 63.6 | 1.17 | 188.0 | 93.51 |
|  | 1.56 | 66.06 | 97.92 |
|  | 1.95 | 19.80 | 99.45 |
| 84.8 | 1.17 | 258.0 | 91.29 |
|  | 1.56 | 128.9 | 95.03 |
|  | 1.95 | 34.2 | 99.00 |

Such results demonstrate that nearly complete removal of water from air can be accomplished, under more practical pressure differential conditions, where the purge flow is only a fraction of the product flow. In the first run shown, essentially no purge was used. As shown by the cleaning ratio of only 18%, the purge that did occur resulted from the co-permeation of oxygen and nitrogen. The results will be seen to be poor, with 16% water removal, again establishing that the co-permeation of the components of air alone is not sufficient to achieve the desired removal of water for satisfactory air drying. In contrast to such poor permeation-type drying, the other runs, with cleaning ratios greater than unity, generally achieved nearly complete removal of the water content of feed air. In such instances, the cleaning ratios will be understood to result from dividing the (purge flow/product flow) ratio by the (lower pressure/higher pressure) ratio. Note that a purge flow constituting only a fraction of the product flow nevertheless provides a cleaning ratio above unity at the increased pressure differential conditions as compared to those of Example 1.

It will be seen from the results of Table II that the degree of drying or other purification, which depends on the use of purge gas at a relatively high cleaning ratio in combination with the other features of the invention, is also influenced by the quantity of gas processed in any particular application, said quantity being expressed by the feed flow rate. It should be understood that, in practical commercial operations, somewhat varying degrees of purification, at the high overall levels compared to cross-flow or permeation cleaning operations, can be achieved by adjusting the relative values of the feed flow rate, the cleaning ratio and/or the purge gas flow rate. In any event, with high values of the cleaning ratio, such as in excess of 1 for nearly complete drying, the water content of air, or the impurity content of a gas, can be reduced to very low values, with a negligible loss of product gas for permeation cleaning purposes.

In both of the examples above, the flow of feed air was outside-in, and the separation portion of the membrane was on the outside surfaces of the fibers. It will be understood that similar or better results can generally be obtained using an inside-out flow pattern, wherein the feed gas is passed into the bores of the hollow fiber membranes. In such latter embodiments, the separation layer of composite membranes, or the thin, dense skin of asymmetric membranes, is typically positioned on the outer shell side of the membrane.

Although the examples relate to the drying of air using a dry air stream as purge gas, it will be appreciated that the feed stream need not be air, but can be any gas with a relatively low permeability relative to water or an impurity to be removed under the applicable operating conditions. Thus, a valuable process gas stream available in an industrial facility can be dried using dry air as a purge stream.

While it has been pointed out that the feed stream can be dried with very little loss of product gas, there may be circumstances, such as said air drying, where it may be desirable to use product gas, with or without subsequent treatment, as a source of purge gas. In cryogenic air separation plants, for example, it is common to have dry, so-called waste streams available that could serve as a source of purge gas for a membrane gas separation system, such as a membrane air dryer, operated in accordance with this invention, to dry feed air passing to the cryogenic plant. A variety of other such combinations, in which the air drying or other gas purification operation of the invention can be integrated with dry gas streams from other industrial operations, will become apparent to those skilled in the art and further enhance the overall benefits of the invention. It will be understood that the ability, in the practice of the invention, to use any dry purge stream whose permeability is much less than that of the fast permeating component (e.g. water) is a key advantage of the present invention, which is not otherwise feasible using the earlier state-of-the-art, e.g. permeation type drying.

Permeable membranes are capable of achieving highly desirable gas separations with a high degree of process efficiency and simplicity, with minimal maintenance and convenience. Air drying and other gas purifications are an important and desirable application of membrane technology, particularly the advantageous hollow fiber membrane technology to which the subject invention relates. By providing for the enhanced drying of air or other processing streams, using hollow fiber membranes having desirable surface area characteristics, and by achieving the desired gas separation with minimal product gas loss due to necessary co-permeation in various prior art approaches, the invention provides a highly valuable advance in the membrane field, one that further extends the practical utility of membrane systems in satisfying the ever-increasing needs of a wide variety of industrial applications.

What is claimed is:

1. A membrane process for the enhanced purification of a feed gas stream comprising:

(a) passing a feed gas stream containing an impurity to be separated therefrom to a permeable membrane system capable of selectively permeating said impurity, said impurity having a separation factor in said system of at least about 15 with respect to said feed stream and/or the components thereof, said membrane system comprising a composite membrane or an asymmetric membrane having a substrate or less dense region porosity greater than about 0.05% to achieve a significant degree of radial mixing across said substrate portion of the membrane;

(b) providing means on the outer side of said membrane to establish a countercurrent flow pattern across the permeate and non-permeate surfaces of the membrane comprising said substrate portion and a skin or separation layer portion thereof, said membrane system comprising hollow fiber membranes arranged so as to achieve an essentially uniform flow of gas across both feed and permeate sides of the membrane comprising said substrate portion and a skin or separation layer portion thereof;

(c) passing purge gas on the permeate side of the membrane, said purge gas facilitating the permeation and removal of said impurity through the membrane, said purge gas being employed at a cleaning ratio of at least about 0.5, said cleaning ratio being the ratio of the STP volumetric purge gas flow rate to the STP volumetric non-permeate product flow rate divided by the ratio of the pressure on the low pressure, permeate side of the membrane to the pressure on the high pressure, feed side of the membrane;

(d) removing non-permeate gas from the membrane system as desired product gas, said non-permeate gas comprising said feed gas stream with essentially all of the impurity removed therefrom, with negligible loss of said feed gas stream as a result of permeation thereof through the membrane; and (e) separately removing purge gas and said permeate gas from the membrane system, said permeate gas comprising essentially all of the impurity to be separated from the feed gas stream, whereby the desired purification is enhanced, with high recovery of the non-permeate product gas, the membrane system exhibiting a significant degree of countercurrency of performance, with the purge gas substituting for co-permeation of desired product gas in facilitating the permeation of the impurity and its removal from the surface of the membrane, thus maintaining the driving force for the passage of the impurity across said membrane.

2. The process of claim 1 in which said cleaning ratio is from about 0.6 to about 1.7.

3. The process of claim 2 in which said cleaning ratio is greater than unity.

4. The process of claim 1 in which said impurity has a separation factor of greater than about 100 with respect to said feed stream.

5. The process of claim 4 in which said impurity has a separation factor of greater than about 1,000 with respect to said feed stream and the components thereof.

6. The process of claim 1 in which said feed gas comprises air, said impurity being water and said purification comprising air drying.

7. The process of claim 6 in which said water has a separation factor of greater than 1,000 with respect to feed air and the oxygen and nitrogen components thereof.

8. The process of claim 7 in which said cleaning ratio is greater than unity, said water being nearly completely removed from said product air.

9. The process of claim 8 in which said hollow fibers are helically wound, with the active length thereof being essentially uniform, thus enabling said uniform flow of gas across the membrane surface to be facilitated.

10. The process of claim 8 in which said means to establish a countercurrent flow pattern across the surfaces of the membrane comprises an impervious barrier that encases the membrane along the longitudinal outer surface thereof.

11. The process of claim 1 in which said substrate porosity is greater than 0.5%.

12. The process of claim 11 in which said substrate porosity is from about 0.5% to about 5% or more.

13. The process of claim 1 in which said feed gas comprises air, said impurity comprises water, said purge gas is essentially dry, the cleaning ratio being greater than unity, said hollow fibers being helically wound with the active length thereof being essentially uniform, said hollow fibers being encased in an impervious barrier along the longitudinal outer surface thereof.

14. The process of claim 13 in which said substrate porosity is greater than 0.5%.

15. The process of claim 14 in which said substrate porosity is from about 0.5% to about 5% or more.

16. A membrane system for the enhanced purification of a feed gas stream comprising:
 (a) conduit means for passing a feed gas stream containing an impurity to be separated therefrom to a permeable membrane system;
 (b) a permeable membrane system adapted to receive said feed gas, said system being capable of selectively permeating said impurity, the material of said membrane system being such that the impurity has a separation factor of at least about 15 with respect to said feed gas and/or the components thereof, said membrane system comprising a composite membrane or an asymmetric membrane having a substrate or less dense region porosity greater than about 0.05% to achieve a significant degree of radial mixing across the substrate portion of the membrane, said composite or asymmetric membrane comprising hollow fiber membranes arranged so as to achieve an essentially uniform flow of gas across the membrane comprising said substrate portion and a skin or separation layer portion thereof;
 (c) means on the outer side of said membrane to establish a countercurrent flow pattern across the permeate and non-permeate surface of the membrane comprising said substrate portion and a skin or separation layer portion thereof;
 (d) conduit means for providing purge gas on the permeate side of the membrane, such as to provide a cleaning ratio of at least about 0.5, said cleaning ratio being the ratio of the STP volumetric purge gas flow rate to the STP volumetric non-permeate product flow rate divided by the ratio of the pressure on the low pressure, permeate side of the membrane to the pressure on the high pressure, feed side of the membrane;
 (e) means for removing non-permeate gas from the membrane system as desired product gas, said non-permeate gas comprising said feed gas stream with essentially all of the impurity removed therefrom, with negligible loss of said feed gas stream as a result of permeation thereof through the membrane; and
 (f) separate means for removing purge gas and said permeate gas from the membrane system said permeate gas comprising essentially all of the impurity to be separated from the feed gas stream,
whereby the membrane system serves to enhance the desired purification, with high recovery of the non-permeate product gas, the membrane system exhibiting a significant degree of countercurrency of performance, with the purge gas substituting for co-permeation of desired product gas in facilitating the permeation of the impurity and its removal from the surface of the membrane, thus maintaining the driving force for the passage of the impurity across the membrane.

17. The membrane system of claim 16 in which said membrane material is such that the impurity has a separation factor of greater than about 100 with respect to the feed stream.

18. The membrane system of claim 17 in which said separation factor is greater than about 1,000.

19. The membrane system of claim 16 in which said conduit means for purge gas is such as to provide a cleaning ratio of from about 0.6 to about 1.7.

20. The membrane system of claim 19 in which said cleaning ratio is greater than unity.

21. The membrane system of claim 16 in which said hollow fibers are helically wound, with the active length thereof being essentially uniform, thus enabling said essentially uniform flow of gas across both sides of the membrane comprising said substrate portion and a skin or separation layer portion thereof to be facilitated.

22. The membrane system of claim 16 in which said means to establish a countercurrent flow pattern across the surfaces of the membrane comprise an impervious barrier that encases the membrane along the longitudinal outer surface thereof.

23. The membrane system of claim 16 in which said surface porosity is greater than 0.5%.

24. The membrane system of claim 23 in which said surface porosity is from about 0.5% to about 5% or more.

25. The membrane system of claim 16 in which said membrane system comprises a composite membrane system.

26. The membrane system of claim 25 in which said substrate comprises polysulfone.

27. The membrane system of claim 16 in which said membrane system comprises an asymmetric membrane system.

* * * * *